(12) United States Patent
Oiwa

(10) Patent No.: US 11,782,658 B2
(45) Date of Patent: Oct. 10, 2023

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Yasuyuki Oiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/877,188

(22) Filed: Jul. 29, 2022

(65) Prior Publication Data

US 2023/0038967 A1    Feb. 9, 2023

(30) Foreign Application Priority Data

Aug. 3, 2021    (JP) .................................. 2021-127733

(51) Int. Cl.
*G06F 3/12*    (2006.01)
*G06F 40/186*    (2020.01)
*G06F 40/106*    (2020.01)

(52) U.S. Cl.
CPC .......... *G06F 3/1243* (2013.01); *G06F 3/1208* (2013.01); *G06F 40/106* (2020.01); *G06F 40/186* (2020.01)

(58) Field of Classification Search
CPC .... G06F 3/1243; G06F 40/186; G06F 40/106; G06F 3/1208; G06F 40/103; G06F 3/1203
See application file for complete search history.

(56) References Cited

U.S. PATENT DOCUMENTS

| 9,378,189 B2 | 6/2016 | Nakagawa | |
| 2013/0262988 A1* | 10/2013 | Nakagawa | G06F 40/106 715/243 |
| 2017/0039745 A1* | 2/2017 | Hayakawa | H04N 1/00161 |
| 2022/0309277 A1* | 9/2022 | Shu | G06F 16/35 |

FOREIGN PATENT DOCUMENTS

JP    2013229006 A    11/2013

\* cited by examiner

*Primary Examiner* — Iriana Cruz
(74) *Attorney, Agent, or Firm* — Venable LLP

(57) ABSTRACT

An information processing apparatus comprises a storage to store a plurality of templates including a region in which data can be placed. The apparatus specifies data to be placed in the plurality of templates; and outputs an image in which the data is placed in a template, from among the plurality of templates, and which is based on data to be placed in the region and including text inputted by a user.

16 Claims, 12 Drawing Sheets

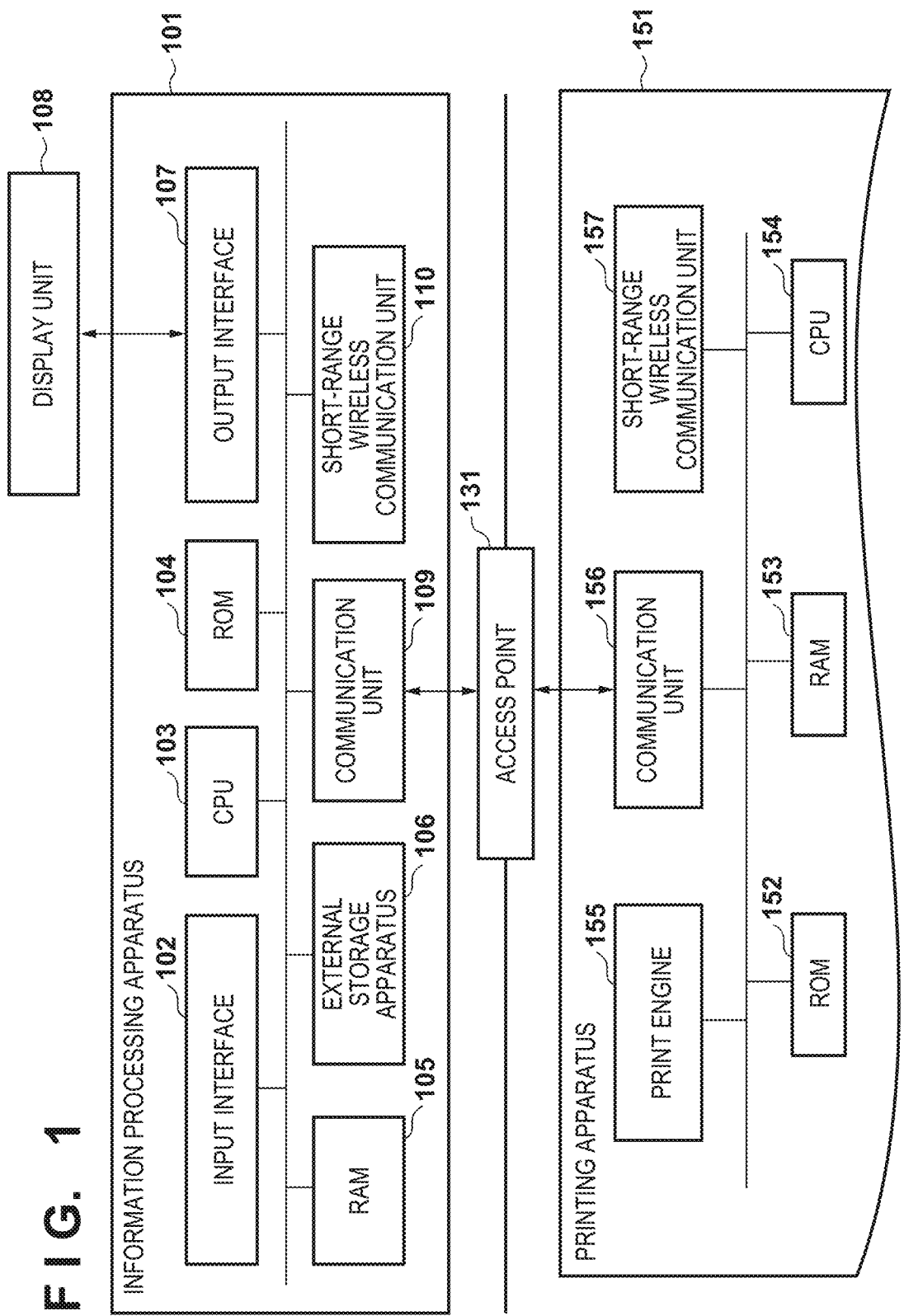

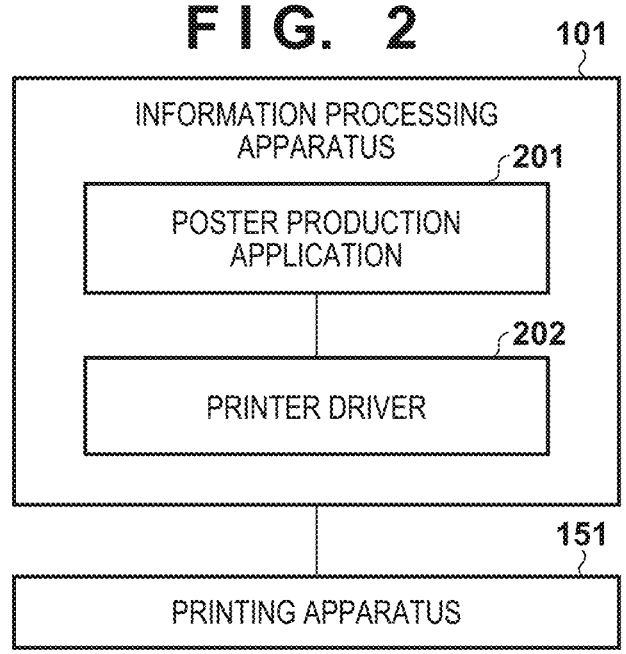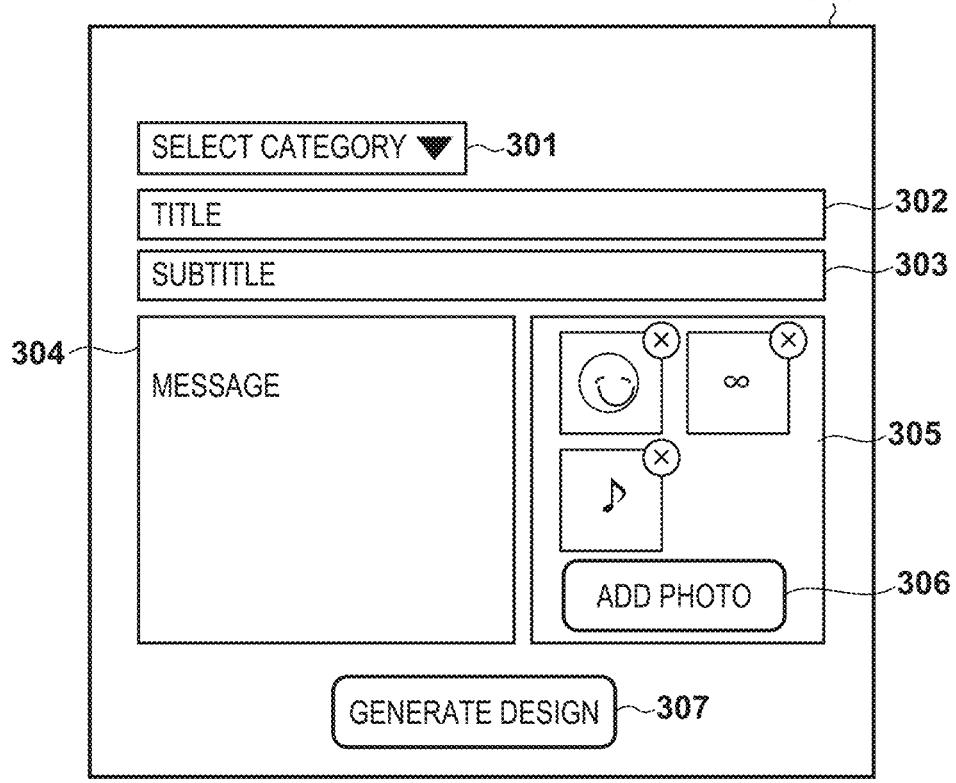

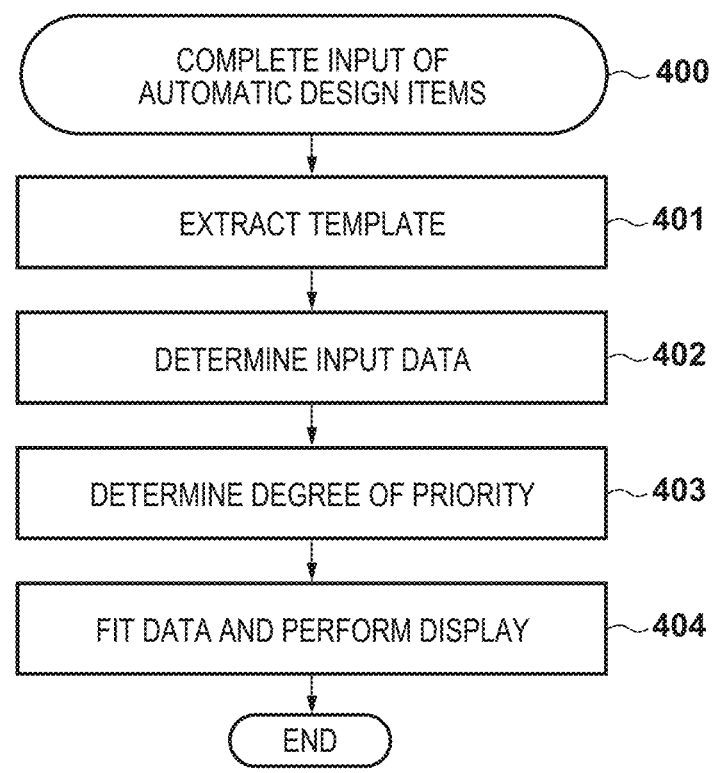

F I G. 5

| ID | CATEGORY | Auto USAGE | NUMBER OF CHARACTERS OF TITLE | NUMBER OF CHARACTERS OF SUBTITLE | NUMBER OF CHARACTERS OF MESSAGE | NUMBER OF IMAGES |
|---|---|---|---|---|---|---|
| 0001 | RESTAURANT, OPENING | POSSIBLE | 5 | 14 | 29 | 1 |
| 0002 | SCHOOL, NOTIFICATION | POSSIBLE | 10 | 20 | 55 | 2 |
| 0003 | RESTAURANT, OPENING | NOT POSSIBLE | 8 | 18 | 89 | 1 |
| 0004 | RETAIL, SALE | POSSIBLE | 20 | 45 | 14 | 0 |

INFORMATION PROCESSING APPARATUS, INFORMATION PROCESSING METHOD, AND MEDIUM

BACKGROUND OF THE INVENTION

Field of the Invention

The present invention relates to an information processing apparatus capable of creating, for example, print data and the like, an information processing method, and a medium.

Description of the Related Art

Production by fitting data to a template with a pre-made layout order to print a desired text or image data is known conventionally. Some application software for realizing print layout processing has been released, especially for producing posters.

Apart from those handled by design production professionals, some of these allow general users to easily make posters with simple operations, despite their lack of design knowledge. In such application software, a user can complete a poster by selecting and editing a desired layout and perform printing.

Japanese Patent Laid-Open No. 2013-229006 discloses a technique for selecting a layout that is suitable for an individual or is likely to be preferred by a user by analysis of information on the user themself, who will be the creator, information on layouts produced so far, and the like.

However, in Japanese Patent Laid-Open No. 2013-229006, a layout is not selected in consideration of text inputted by the user.

SUMMARY OF THE INVENTION

The present invention makes it possible to output a layout based on text inputted by a user.

The present invention comprises the following configuration. According to an aspect of the present invention, provided is an information processing method in an information processing apparatus comprising a storage unit configured to store a plurality of templates including a region in which data can be placed; the method comprising: specifying data to be placed in the plurality of templates: and outputting an image in which the data is placed in a template, from among the plurality of templates, and which is based on data to be placed in the region and including text inputted by a user.

According to the present invention, it is possible to output a layout based on text inputted by a user.

Further features of the present invention will become apparent from the following description of exemplary embodiments with reference to the attached drawings.

BRIEF DESCRIPTION OF THE DRAWINGS

FIG. 1 is a diagram illustrating an example of a configuration of a system and an example of a hardware configuration of an apparatus.

FIG. 2 is a diagram illustrating an example of a software configuration of an information processing apparatus.

FIG. 3 is a diagram illustrating an example of a basic setting screen in the present application.

FIG. 4 is a flowchart for explaining processing for controlling automatic design.

FIG. 5 is a diagram illustrating an example of a configuration of an information file included in a template.

DESCRIPTION OF THE EMBODIMENTS

Figure 6:
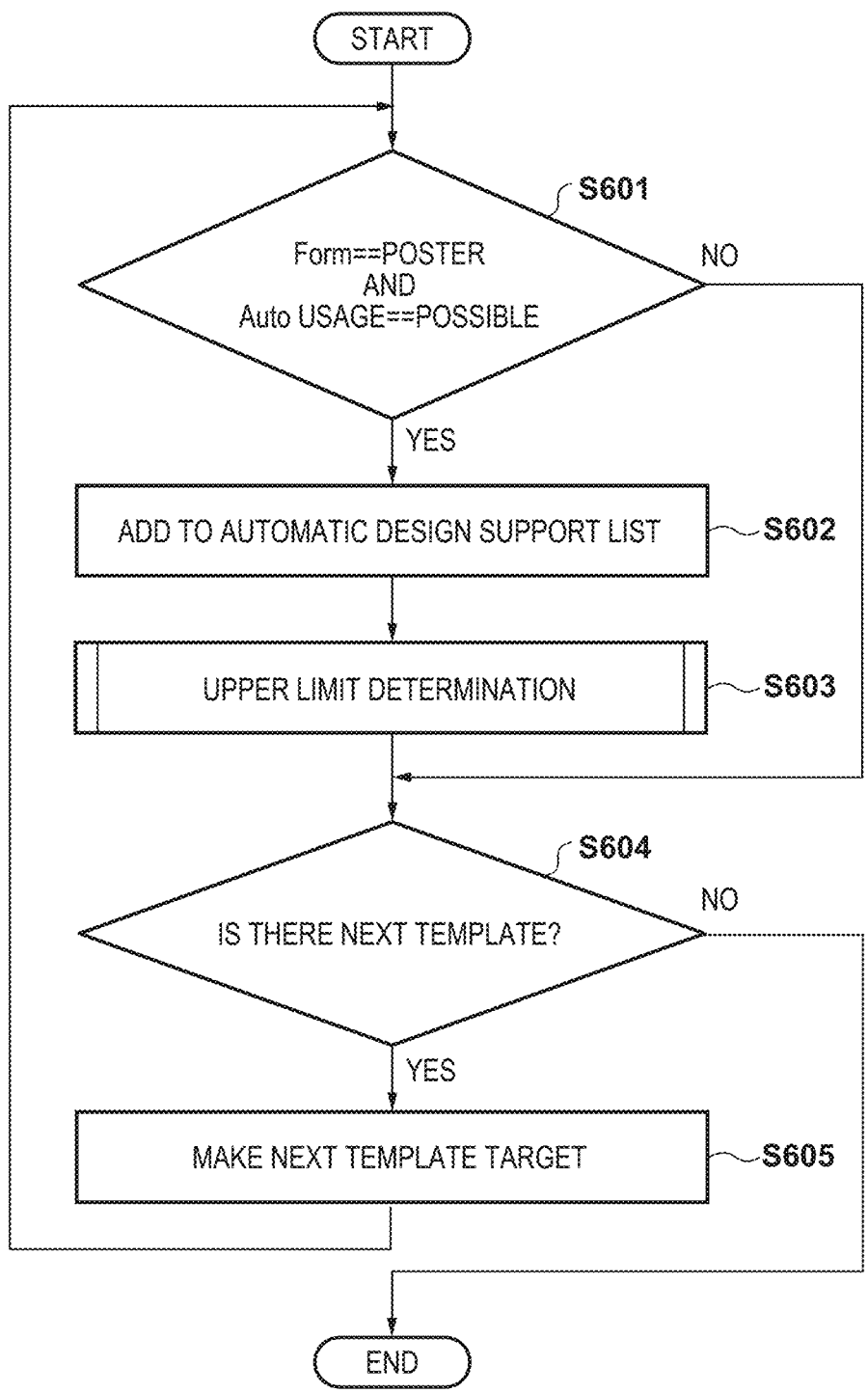
FIG. 6 is a flowchart for explaining processing for determining a template to be used in automatic design.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features max be combined as appropriate. Furthermore, in the attached drawings, the same reference numerals are given to the same or similar configurations, and redundant description thereof is omitted.

First Embodiment

<System Configuration>

An example of a configuration of a system according to the present embodiment will be described with reference to FIG. 1. The present system is configured to include an information processing apparatus 101 and a printing apparatus 151, and printing processing is executed by transmitting print data prepared by the information processing apparatus 101 to the printing apparatus 151 via a network. The communication between the information processing apparatus 101 and the printing apparatus 151 can be performed via an access point 131, for example, by a wireless LAN conforming to IEEE 802.11 standard series. In the following, an embodiment based on a network configuration using the access point 131 will be described however, another configuration in which the information processing apparatus 101 and the printing apparatus 151 can communicate with each other may be used. For example, the information processing apparatus 101 and the printing apparatus 151 may be connected via a wired line (not illustrated). In addition, an apparatus comprising both the functions of the information processing apparatus 101 and the functions of the printing apparatus 151 may be used, in which case the exchange of information between the information processing apparatus 101 and the printing apparatus 151 may be performed via a bus or the like in the apparatus. Furthermore, a plurality of blocks illustrated in FIG. 1 may be integrated into one block, or one block may be divided into a plurality of blocks. Moreover, a block other than those illustrated in FIG. 1 may be added, and one or more of the blocks illustrated in FIG. 1 may be omitted.

The information processing apparatus 101 is a computation apparatus capable of converting data to be printed into print data, such as a personal computer (PC), a smart phone, a portable terminal, a notebook PC, a tablet terminal, and a PDA (Personal Digital Assistant), for example. In recent years, there has also been a mode of executing processing in which data to be printed is processed by a server or the like connected on a network and is browsed on the information processing apparatus 101, The printing apparatus 151 is an arbitrary printer of an image forming method, capable of acquiring print data from an external apparatus, such as the information processing apparatus 101, and executing printing processing. Assume that printing by the printing apparatus 151 is performed in an inkjet method in the present embodiment; however, printing may be performed in another arbitrary method, such as an electrophotographic method, for example. In addition, the printing apparatus 151 may be a multifunction peripheral comprising a plurality of functions, such as a copy function, a FAX function, and a print function.

The information processing apparatus 101 is configured to include, for example, an input interface 102, a CPU 103, a ROM 104, a RAM 105, an external storage apparatus 106, an output interface 107, a communication unit 109, and a short-range wireless communication unit 110. Here, CPU, ROM, and RAM are acronyms for Central Processing Unit, Read Only Memory, and Random Access Memory, respectively.

FIG. 1 illustrates an example in which the information processing apparatus 101 displays information on a display apparatus, such as an external display (display unit 108); however, the display unit 108 may be included in the information processing apparatus 101.

The input interface 102 is an interface for receiving data input and operation instructions from a user. The input interface 102 is configured by, for example, a physical keyboard, buttons, a touch panel, and the like. The output interface 107 and the input interface 102, which will be described later, may be integrated so that screen output and the reception of operation from the user are performed using common hardware.

The CPU 103 is a system control unit and controls the entire information processing apparatus 101. The ROM 104 stores fixed data such as control programs to be executed by the CPU 103, a data table, an embedded operating system (hereinafter referred to as the "OS") program.

In the present embodiment, the respective control programs stored in the ROM 104 perform software execution control such as scheduling, task switching, and interrupt processing under the control of the embedded OS stored in the ROM 104. The RAM 105 is configured by a static random access memory (SRAM) that requires a backup power supply or the like. Since data is held by a primary battery for data backup (not illustrated), the RAM 105 can store important data, such as a program control variable, without volatility. A memory area for storing setting information, management data, and the like of the information processing apparatus 101 may also be provided in the RAM 105. The RAM 105 can also be used as the main memory and work memory of the CPU 103.

The external storage apparatus 106 stores an application that provides a print execution function, a print information generation program that generates print information that can be interpreted by the printing apparatus 151, and the like. Furthermore, the external storage apparatus 106 may store various programs, such as a control program for transmitting and receiving information to and from another apparatus (for example, the printing apparatus 151) connected via the communication unit 109, and various kinds of information used by these programs. The external storage apparatus 106 also stores a poster production application program to be described later, which is loaded into the RAM 105 and executed. In addition, poster layout template data (hereinafter, simply referred to as templates) to be used by the poster production application is also stored.

In addition to images and text laid out in advance, a template includes a region in which images and text specified or inputted by the user will be placed.

The output interface 107 is an interface for the display unit 108 to perform control for the display of data and the presentation of information on the state of the information processing apparatus 101. The output interface 107 outputs, for example, control information for displaying information on the display unit 108 and display target information. The display unit 108 is configured to include a light emitting diode (LED), a liquid crystal display (LCD), and the like and displays data and notifies the user of the state of the information processing apparatus 101. The display unit 108 may be caused to display a soft keyboard including keys, such as a power key, a numeric value input key, a mode setting key, a determination key, and a cancel key, and accept input from the user via the soft keyboard.

The communication unit 109 is configured to include a baseband circuit, a radio frequency (RF) circuit, and the like for performing data communication by connecting with an external apparatus, such as the printing apparatus 151. For example, the communication unit 109 may communicate with the printing apparatus 151 via the access point 131 that exists separately from the information processing apparatus 101 and the printing apparatus 151. The access point 131 may be a device such as a wireless LAN router that operates in accordance with a wireless communication method conforming to IEEE 802.11 standard series, for example. The communication unit 109 may also establish direct connection with the printing apparatus 151 in accordance with a protocol, such as Wireless Fidelity (Wi-Fi) Direct®. Furthermore, if the printing apparatus 151 includes an access point (not illustrated), the communication unit 109 may establish direct connection with the printing apparatus 151 by connecting to that access point. The communication unit 109 may be configured to perform communication in Wi-Fi®; however, it may be perform communication by another wireless communication system, such as Bluetooth®.

The short-range wireless communication unit 110 establishes wireless connection with a short-range wireless communication unit 157 of the printing apparatus 151 and executes data communication based on at least the fact that the printing apparatus 151 (an external apparatus) has entered a predetermined short-distance range. The short-range wireless communication unit 110 performs communication by a communication method different from the communication unit 109, such as a Bluetooth Low Energy (BLE), for example.

The printing apparatus 151 is configured to include, for example, a ROM 152, a RAM 153, a CPU 154, a print engine 155, a communication unit 156, and the short-range wireless communication unit 157.

The communication unit 156 is configured to include a baseband circuit, a radio frequency (RF) circuit, and the like for connecting with an external apparatus, such as the information processing apparatus 101. The communication unit 156 corresponds to the communication unit 109 of the information processing apparatus 101 and performs communication using a wireless communication method, such as Wi-Fi and Bluetooth, for example. The communication unit 156 may, for example, function as an access point, be directly connected to the communication unit 109 of the information processing apparatus 101 according to a predetermined protocol as described above, or be connected via the external access point 131 and the like. When functioning as an access point, the communication unit 156 may include hardware for functioning as an access point or utilize software that allows it to function as an access point. The information processing apparatus 101 and the printing apparatus 151 are connected to one access point 131 in the example of FIG. 1; however, they may connected via a network by each being connected to a separate access point connected to the network.

The short-range wireless communication unit 157 establishes wireless connection with the short-range wireless communication unit 110 of the information processing apparatus 101 and executes data communication based on at least the fact that the information processing apparatus 101 (an external apparatus) has entered a predetermined short-distance range. The short-range wireless communication unit 157 corresponds to the short-range wireless communication unit 110 of the information processing apparatus 101 and performs communication by a wireless communication method, such as BLE, for example. The data amount of print information transmitted from, for example, the information processing apparatus 101 and the like, is large and need high-speed large-capacity communication and, therefore, are received via the communication unit 156 capable of communicating at a higher speed than the short-range wireless communication unit 157.

The RAM 153 is a memory similar to the RAM 105. The RAM 153 is provided with a memory area for storing setting information, management data, and the like of the printing apparatus 151. The RAM 153 is also used as the main memory and work memory of the CPU 154, serves as a reception buffer for temporarily storing print information received from the information processing apparatus 101 and the like, and stores various kinds of information. The ROM 152 stores fixed data, such as control programs to be executed by the CPU 154, a data table, and an OS program. By the respective control programs stored in the ROM 152 being executed by the CPU 154, software execution control such as scheduling, task switching, and interrupt processing can be executed under the control of the embedded OS stored in the ROM 152. The CPU 154 is a system control unit and controls the entire printing apparatus 151. The printing apparatus 151 may be equipped with a memory, such as an external HDD and an SD card, as an optional device, and information stored in the printing apparatus 151 may be stored in such a memory.

The print engine 155 forms an image on a printing medium, such as paper, using a printing agent, such as ink, based on information stored in the RAM 153, print information received from the information processing apparatus 101, and the like and outputs a printing result.

<Poster Production Application>

FIG. 2 is a diagram illustrating an example of a functional configuration of the information processing apparatus 101. As its functional configuration, the information processing apparatus 101 includes, for example, a poster production application 201 that executes processing to be described later and a printer driver 202 that generates print data that can be interpreted by the printing apparatus 151. When a print instruction is inputted by the user on a screen of the poster production application 201 to be described later, the printer driver 202 receives application data outputted from the poster production application 201 and generates print data. By the printer driver 202 transmitting the generated print data to the printing apparatus 151, printing processing is executed in the printing apparatus 151.

Next, a description will be given for an example of a flow of production operation by the poster production application 201 described above. FIG. 3 illustrates an example of a basic setting screen to be displayed on the display unit 108 by the CPU 103 of the information processing apparatus 101 executing a program corresponding to the poster production application 201 stored in the ROM 104 or the external storage apparatus 106, for example. A basic setting screen 300 includes, as an example, a category selection region 301, a title character input setting region 302, a subtitle character input setting region 303, and a message character input setting region 304. Furthermore, it includes an input image addition region 305, an input image addition button 306, and a design generation button 307.

The category selection region 301 is a region for selecting a category held as respective information by respective poster design templates to be described later. Examples of selection elements include keywords, such as restaurant, opening, school, and sale, and they are displayed in a list. When a pull-down button of the category selection region 301 is pressed by user operation, a list of selectable categories is displayed, and the user can make a selection as a piece of information for template selection by the poster production application 201. Regarding the list of selectable categories displayed by the pull-down button being pressed, only a category held as internal information in respective poster design templates stored within the poster production application 201 may be displayed, for example. Alternatively, a predetermined list of categories that are not included in the category may be displayed. When displaying the internal information of templates in a list, processing for extracting information from each template is performed when the application is started. Each template may be associated with one or more categories.

The title character input setting region 302 is a region for inputting text of a title to be inputted to a poster to be edited. By selecting this region and inputting characters, the user can reflect a desired character string as a title in a poster to be edited. The subtitle character input setting region 303 is a region for inputting text of a subtitle to be inputted to a poster to be edited. The message character input setting region 304 is a region for inputting text of content to be inputted to a poster to be edited.

The input image addition region 305 and the input image addition button 306 are regions for inputting an image to be incorporated in a poster to be edited. Regarding addition of an image, an image may be inputted by dragging and dropping the image from outside the application into a frame of the input image addition region 305 or by file specification from a press of the input image addition button 306, Regarding an input image, an image format that can be inputted, such as JPEG and PNG, for example, is defined, and processing for not accepting input of another format is performed. Furthermore, the number of images that can be inputted is limited by the application to a predetermined number, such as an upper limit of three, if an image limit number is exceeded, the input image addition button 306 becomes inactive and cannot be pressed. Alternatively, dragging and dropping an image into the input image addition region 305 is not reflected. An image for which input setting has been performed with an upper limit of three images can be displayed as a thumbnail image in a region of the input image addition region 305 and can be confirmed. Furthermore, a deletion mark is added to a thumbnail image displayed in the region of the input image addition region 305, and in order to cancel addition, deletion can be performed by pressing this mark.

By the design generation button 307 being pressed, the poster production application 201 begins processing for automatically determining a design of a poster. However, if an input requirement is not fulfilled, the design generation button 307 is displayed in an inactive state and cannot be pressed. For example, since character input to the title character input setting region 302 is required input information, if no input is made, the design generation button 307 will not become active, and the processing does not proceed to the next step. In the present embodiment, only title input is a required item, but depending on the characteristics of the application, any item may be a required item.

By pressing of the design generation button 307, processing for automatically determining a design (automatic design) based on input information to the basic setting screen 300 is started. A general description is given for the flow of processing up to display in order of priority thought to be desired by the user of a plurality of candidates for a template to be a target of automatic design processing, FIG. 4 is a flowchart for explaining a flow of that processing. These template candidates can also be said to be candidates for an image, such as a poster, to be eventually generated.

First, the processing is started by completion of input setting information by the user on the basic setting screen 300 described above (step S400), One or more templates to be a target of automatic design are chosen (also referred to as extraction or selection) from among templates held in the application based on a predetermined condition, such as a selected category, for example (step S401). For each selected template, evaluation values each indicating whether respective inputted element is appropriate for being fit into a predetermined region of the template is calculated based on the input setting information described above and content of an information file held by each template (step S402). It can be said that these evaluation values indicate degrees of suitability. Then, comprehensive determination is made based on an evaluation value of each element calculated for each template, and sorting is performed in order of priority starting from one with the highest total evaluation value (step S403). After sorting, the user's input data is actually embedded in the respective templates, and thumbnail image data of a poster is generated. (step S404) and displayed on the display unit 108. The order in which poster thumbnail images are displayed need only accord with the order in which the templates have been sorted. That is, it may be displayed in order of high evaluation. A description will be given for steps S401 to S404.

(Template Extraction Step S401)

A template is configured by format data, such as JPG, PNG, and SVG, of image data and an information file; however, a detailed description thereof will be omitted. This information file included in an internal configuration will be described in FIG. 5.

FIG. 5 represents a list of configurations of the aforementioned information file included in a template. FIG. 5 illustrates examples of a template information file in which a format (Form) is "poster". A description is given for template information whose ID is 0002 as an example; a category is set to "school" and "notification". In addition, Auto usage "possible" is information for determining whether it can be used as a candidate for template for automatic design. A method for using this information will be described in a flow for extracting a template to be described later. In addition, the number of characters (a length of text) that serves as a criterion for enabling usage as input data for each of a title, subtitle, and message and the number of images that can be incorporated into the template design are also held as information. In the template information whose ID is 0002, 10, 20, 55, 2 are set in that order. A template format (Form) may include those other than a poster; however, in the present example, a description will be given using a poster as an example.

FIG. 6 illustrates a flow of extracting a template in step S401. This flow focuses on the templates held by poster production application and confirms them in order.

First, in step S601, the present application determines whether or not a parameter "Form" in an information file is "poster" and "Auto usage" is possible for a first template of interest. In the example of FIG. 5, the Form attributes of all of the exemplified templates are "poster"; therefore. "Auto usage" information of a template of interest is focused on and it is determined whether its value is "possible", If Form is "Poster" and a value of "Auto usage" is "possible", a template of interest is added to a candidate list as a candidate for template to be used (step S602). Next, a subflow for determining an upper limit of a template is executed (step S603). In step S603, an upper limit of the number of characters is determined for an entry field of each of a title, a subtitle, and a message of the template of interest. This concludes the processing related to the template of interest.

Figure 7:
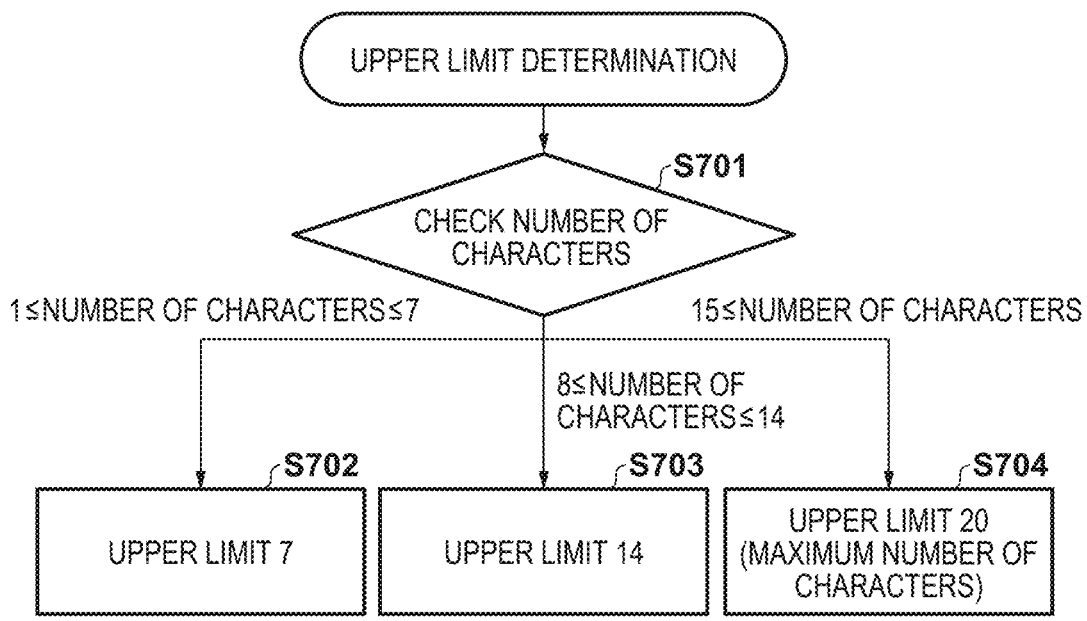
FIG. 7 is a flowchart for explaining processing for determining a template to be used in automatic design.

In step S604, it is determined whether there is a next template, and if so, the next template is se as a new template of interest in step S605 and then the processing is returned to step S601. The candidate templates are listed by the above procedure being executed until there are no unprocessed templates in step S604. A list of candidates for a template may be a list of identification information (IDs) of the templates, FIG. 7 illustrates the details of step S603. FIG. 7 is processing for performing grouping for adjusting characters for each of the set number of characters of a title, a subtitle, and a message for each template. FIG. 7 illustrates an example of processing for grouping templates by title. In step S701, it is determined to which range the number of characters set as the number of characters of a title of an information file of a template of interest belongs by comparing it with a plurality of predetermined thresholds. For titles, grouping is performed according to which of the three ranges (one or more and seven or less characters, eight or more and 14 or less characters, and 15 or more characters) of the number of characters a title belongs. For example, if the number of characters of a title in a template information file is "10", a template is grouped in a group 2. whose range of the number of characters of a title is eight or more and 14 or less characters and upper limit is 14 characters (step S703). Alternatively, if the number of characters of a title is "18", since the number of characters is 15 or more, a template is grouped in a group 3 whose upper limit is 20 characters (step S704). Similarly, if the number of characters of a title is seven or less characters, a template is grouped in a group 1 whose range of the number of characters of a title is one or more and seven or less characters and upper limit is 7 characters (step S702).

As described above, in this example, the templates are grouped according to the number of characters of a title set for the templates. In FIG. 7, a description has been given for the title; however, grouping is performed by the same procedure for the number of characters of a subtitle and the number of characters of text. However, for each of a subtitle and text the range of numbers of characters for each group and the number of groups are different from the title. For example, a subtitle can be classified into three groups whose ranges of numbers of characters are one or more and 14 or less characters, 15 or more and 27 or less characters, and 29 or more characters. For example, text can be classified into two groups whose ranges of the number of characters are one or more and 40 or less characters and 41 or more characters. Furthermore, the processing of FIG. 7 may be omitted by directly referring to a range for the maximum number of characters set in each region of the template instead of referring to the group.

In the present embodiment, to increase display processing, the processing of FIG. 6 performed asynchronously at the time of display of the basic setting screen 300. A timing at which to start processing may be another operation, such as when the design generation button 307 is pressed.

(Input Data Determination)

Figure 9:
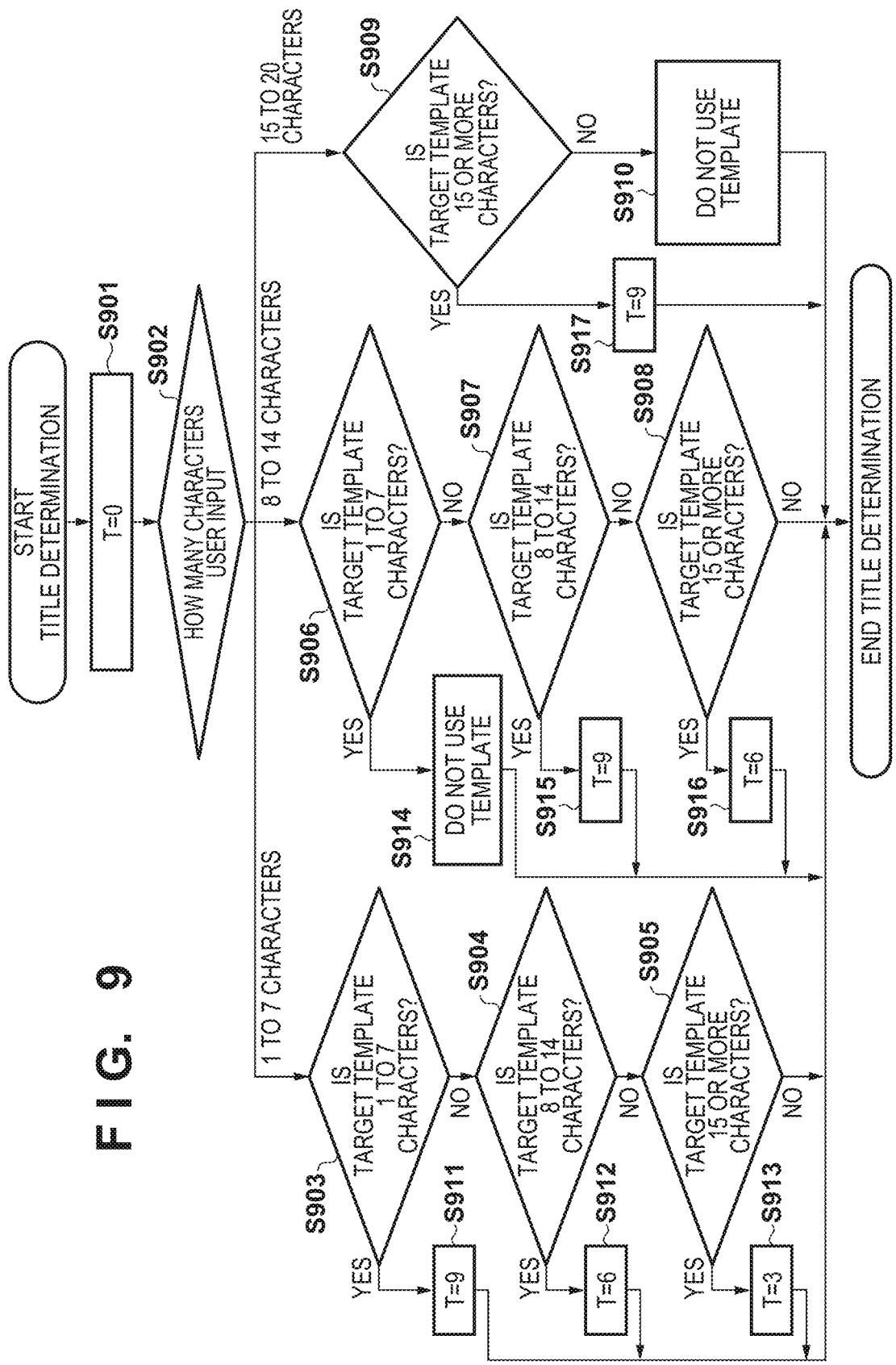
FIG. 9 is a flowchart for explaining processing for determining use of template in automatic design with respect to information inputted by a user.
Figure 10:
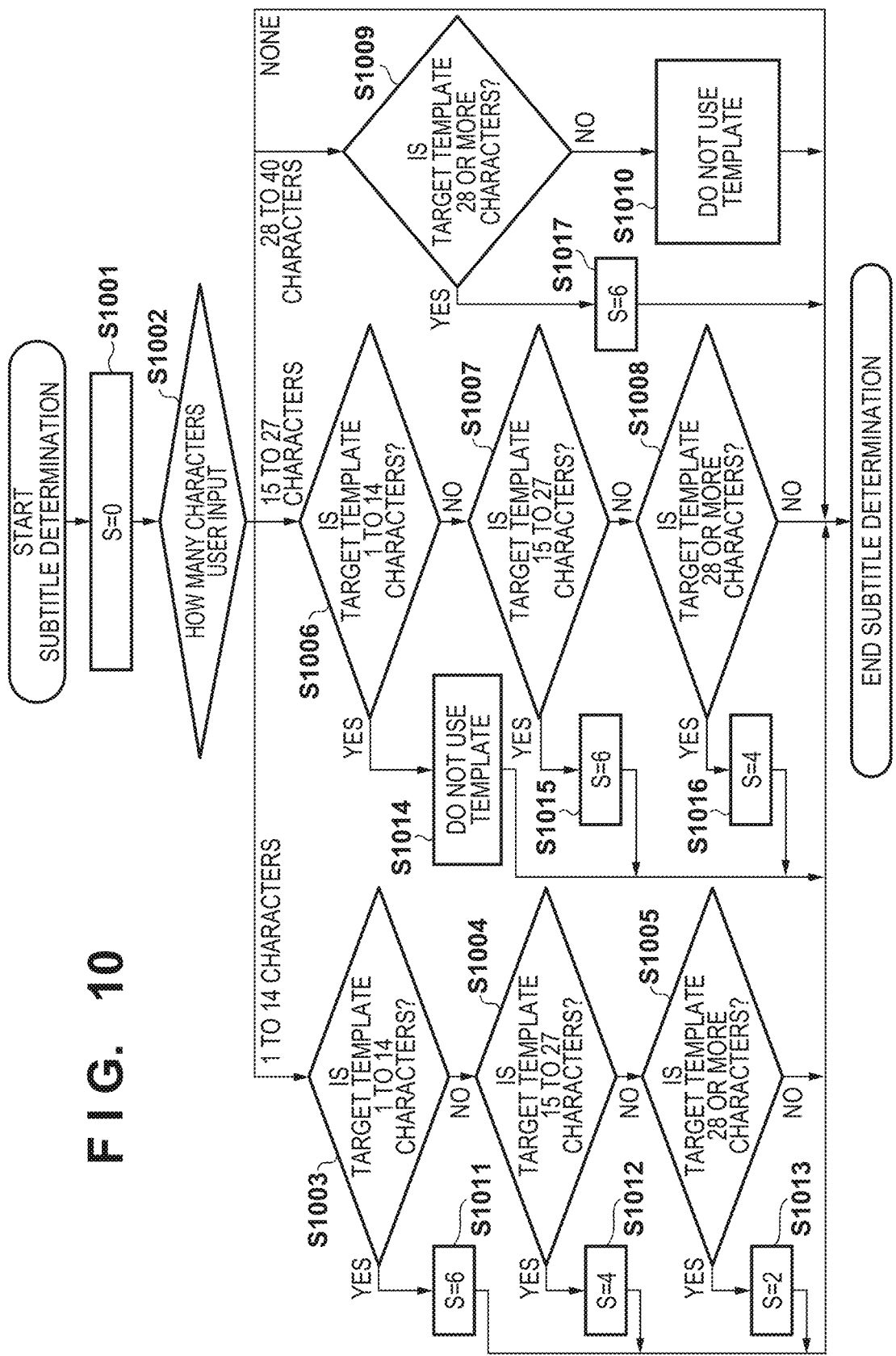
FIG. 10 is a flowchart for explaining processing for determining use of template in automatic design with respect to information inputted by a user.
Figure 11:
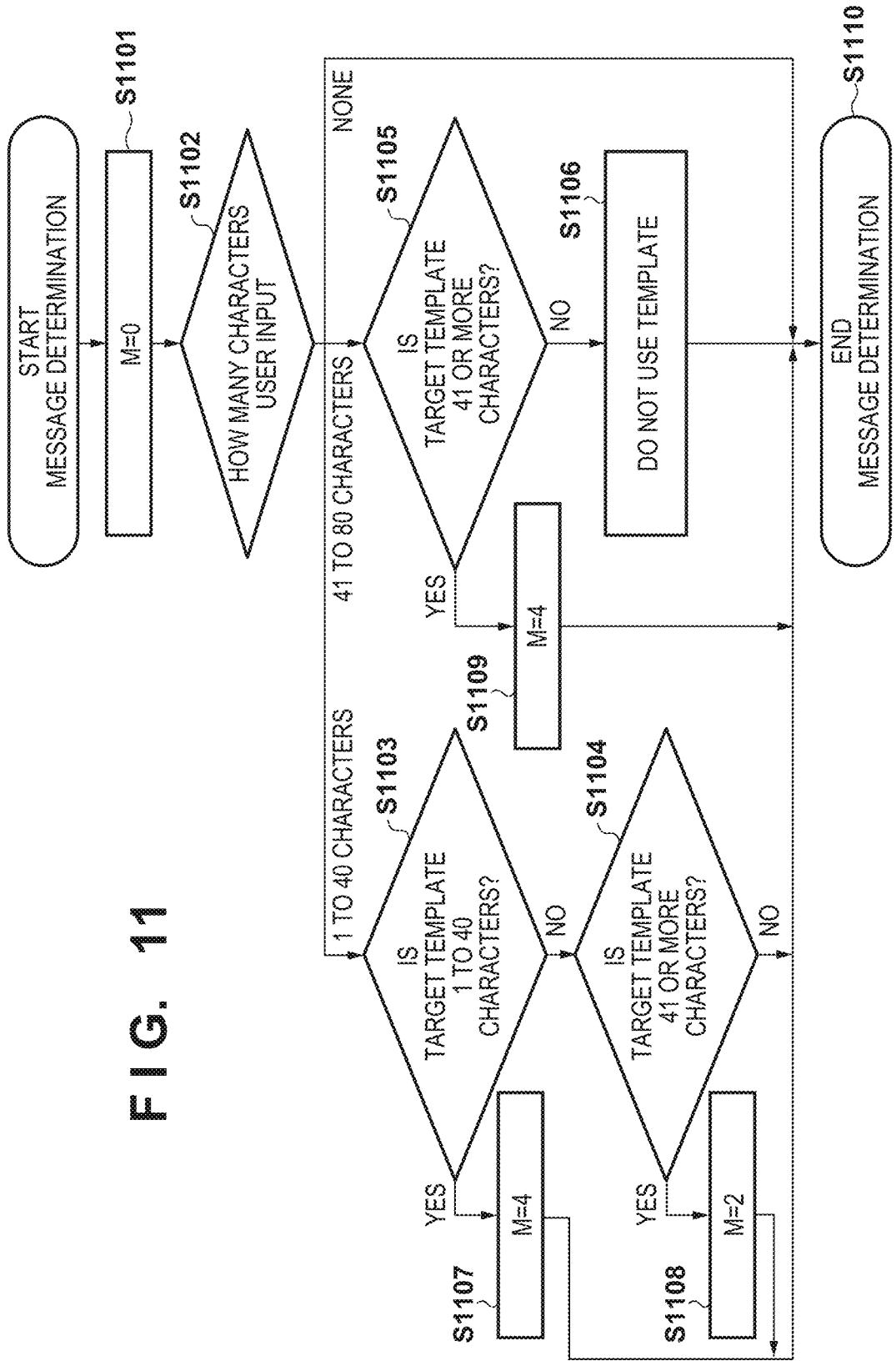
FIG. 11 is a flowchart for explaining processing for determining use of template in automatic design with respect to information inputted by a user.

Next, for each of the templates listed by template extraction, a template to be used is determined based on the user's input information by sequentially performing image determination (FIG. 8), title determination (FIG. 9), subtitle determination (FIG. 10), and message determination (FIG. 11). These processes correspond to step S402 of FIG. 4. That is, although each of FIGS. 6, 8, 9, 10, and 11 is illustrated separately, they may be executed as a series of processes. Either way, they are executed by the CPU 103 as part of the processing performed by the poster production application 201. A template to be used is a template that becomes a candidate for poster fabrication. In each process, processing is performed sequentially for all the templates included in the list of candidates for a template created in the procedure of FIG. 6, focusing on each template. Input data is determined according to the groups corresponding to the ranges of numbers of characters exemplified in FIG. 7. This is an example for the sake of descriptive convenience, and the ranges of numbers of characters defined in advance for the templates may be changed as appropriate, in which case determination criteria in a procedure to be described later may also be changed according to the changed numbers of characters.

Figure 8:
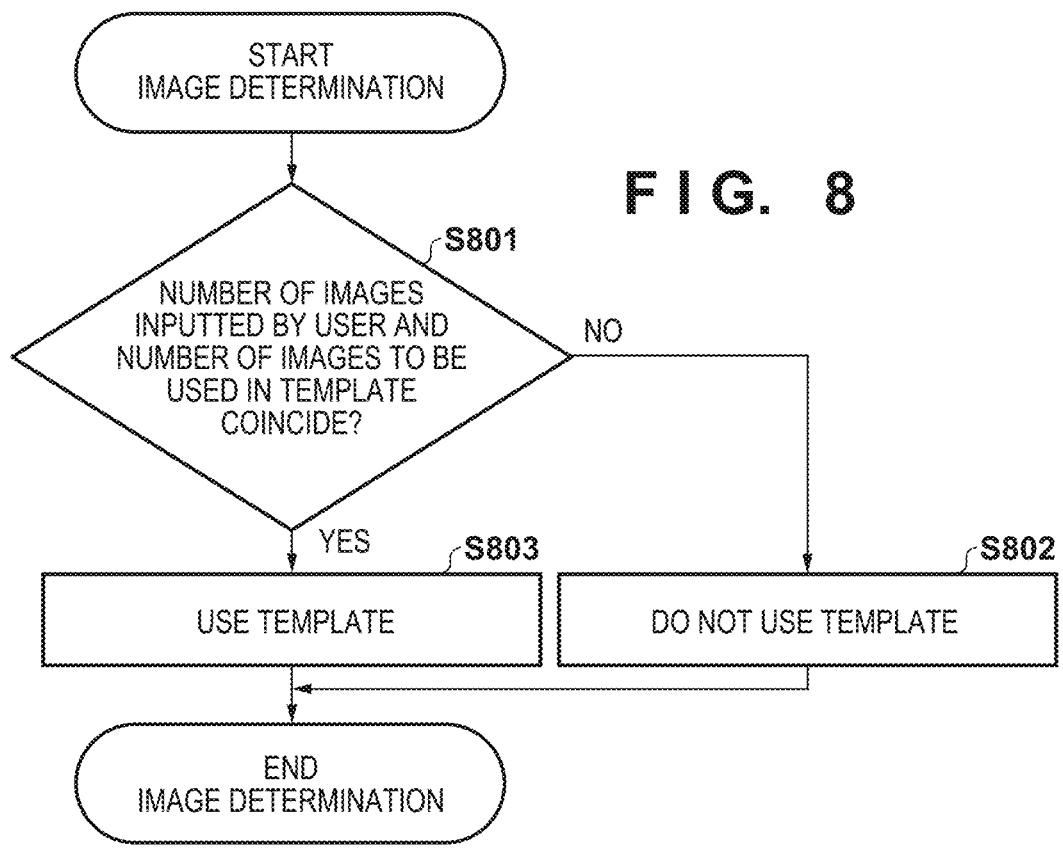
FIG. 8 is a flowchart for explaining processing for determining use of template in automatic design with respect to information inputted by a user.

First, image determination illustrated in FIG. 8 is performed. It is checked, in a template of interest (or a target template), whether the number of images added by the user to the input image addition region 305 matches a setting value in a column of the number of images of an information file included in the template (step S801). If the numbers of images to be used do not match, the target template does not meet a condition and is, therefore, removed from the list of candidates for a template (step S802). If the numbers of images match, the target template remains as a template to be used in the candidate list (step S803), When the determination is completed, the processing is repeated from step S801 until the processing is completed for all the templates in the candidate list, focusing on the next template in the candidate list.

<Determination of Title Evaluation Value>

Next, title setting is evaluated. This is illustrated in FIG. 9. For evaluation of text in the following, an evaluation value T is assigned to each template in the candidate list. An evaluation value for a title is set according to the groups based on the number of characters of a title of each of the listed templates described in FIG. 7. The procedure of FIG. 9 is executed on each of templates in the candidate list by focusing on them sequentially. First, the evaluation value T is initialized (step S901). The evaluation value T is associated with each template. Next, the range of numbers of characters of a template title inputted by the user is determined (step S902). Next, in accordance with the range of numbers of characters in a title inputted by the user, it is determined to which group based on those numbers of characters of a title the target template belongs. In this example, the respective templates are classified into a group 1 (1 to 7 characters), a group 2 (8 to 14 characters), and a group 3 (15 to 20 characters) based on the number of characters of a title. Then, an evaluation value is determined for the target template.

First, if the number of characters of a title inputted by the user is in a range of 1 to 7, it is determined whether the target template is in the group 1 (1 to 7 characters) (step S903). Here, if the number of characters of a title inputted by the user is within this range, it is determined that its coincidence with the number of characters in a title of the template is high, and the evaluation value is high. As an example here, the evaluation value T=9 is set, and the evaluation value T is determined and added to the target template (step S911). Instead of adding the evaluation value to the template, the evaluation value may be stored in association with the identification information of the target template in the candidate list. If the number of characters of a title of the target template is not in a range of 1 to 7 characters, the processing proceeds to the next step, and it is determined whether the number of characters of a title of the target template is in a range of 8 to 14 characters (step S904).

If the number of characters is within this range, regarding the number of character of a title of a template, T=6 is set as an evaluation value conforming to the previous highest evaluation value and the title evaluation value T is determined and added to the template (step S912) in this example. If the number of characters of a title of the target template is not within the range of 8 to 14 characters, it is determined whether the number of characters of a title of the target template is 15 characters or more (step S905). If so, in this example, the evaluation value T=3 is set, and the title evaluation value T is determined and added to the template (step S913).

Similarly, if the number of characters of a title inputted by the user is in a range of 8 to 14 characters, it is determined whether the target template is in the group 1 (1 to 7 characters) (step S906). If so, the target template is removed from the list of candidates for use, assuming that the number of characters are too large for the template in the group 1 (step S914). That is, it is deleted from the selected list of candidates for a template. Otherwise, in the next determination step, it is determined whether the target template is in the group 2, that is, the number of characters in a title is in the range of 8 to 14 characters (step S907). If so, the evaluation value T=9 is set as a high evaluation value, and the evaluation value T is determined and added to the target template (step S915). If it is determined otherwise in step S907, it is determined whether the target template is in the group 3, that is, the number of characters of a title is 15 characters or more (step S908). If so, a value T=6 is set, and the title evaluation value T is determined and added to the target template (step S916).

Lastly, if the number of characters of a title inputted by the user is 15 to 20 characters, it is determined whether the target template is included in the group 3 (15 or more characters) (step S909), If so, a value T=9 is set as a high evaluation, and the evaluation value T is determined and added to the target template (step S917) Otherwise, the target template is removed from the candidates for design use (step S910). If the evaluation value 1 of all templates in the candidate list is determined, the title determination flow ends. Since it is required that a title be inputted, at least one character is inputted; therefore, a case where it has not been inputted will not be evaluated if none applies in the above determination, the determination value 1 of the target template remains 0.

As described above, in the procedure of FIG. 9, the number of characters of an inputted title and the maximum number of characters set for a title region are each separated into levels (grouped as described above) a predetermined range of numbers of characters to which each belongs. If the respective ranges are matched, the target template is given a high evaluation. If the range to which the number of characters of an inputted title belongs does not match the range to which the maximum number of characters belongs, the evaluation varies depending on how they do not match. If the ranges do not match and the number of inputted characters is greater than the maximum number of characters, the target template is deleted from the candidates and will not be evaluated. Meanwhile, if the ranges do not match and the number of inputted characters is shorter than the maximum number of characters, an evaluation lower than a high evaluation is given. There are also degrees of low evaluation, and the greater the gap between the number of inputted characters and the predetermined maximum number of characters for the range, the lower the evaluation.

<Determination of Subtitle Evaluation Value>

In FIG. 10, subtitle setting is determined. This determination is executed on each of templates in the candidate list by focusing on them sequentially.

First, the processing is started with initialization of setting of an evaluation value S of a template (step S1001). The evaluation value S is associated with each template. Similarly to the determination of a title evaluation value in FIG. 9, the evaluation value S is set in subtitle determination for each template for each classification of groups (1 to 14 characters), (15 to 27 characters), and (28 to 40 characters) in subtitle groups. It is determined in what range the number of characters of the subtitle inputted by the user is (step S1002). If it is 1 to 14 characters, it is determined whether the number of characters of a subtitle of a target template is a group 1 (within the range of 1 to 14 characters) (step S1003). If so, the determination value S is stored as the determination value S=6 (high determination value) in association with the target template (step S1011). Otherwise, it is determined whether the number of characters of the subtitle of the target template is a group 2 (within the range of 15 to 27 characters) (step S1004). If it is within the range, the evaluation value S is stored as the determination value S=4 (medium determination value) in association with the target template (step S1012). Otherwise, it is determined whether the number of characters of the subtitle of the target template is a group 3 (28 or more characters) (step S1005). If so, the determination value S is stored as the determination value S=2 in association with the target template (step S1013). If none applies, the processing proceeds to determination of the next template without setting the evaluation value S.

If the number of characters of inputted subtitle is 15 to 27 characters, it is determined whether the number of characters of a subtitle of a target template is the group 1 (within the range of 1 to 14 characters) (step S1006). If it is within a range of the group 1, the target template is removed from the candidate list (step S1014). If it is outside the range, it is determined whether the number of characters of the subtitle of the target template is the group 2 (the range of 15 to 27 characters) (step S1007). If it is within the range of the group 2, the evaluation value S is stored as the evaluation value S=6 in association with the target template (step S1015). Otherwise, it is determined whether the number of characters of the subtitle of the target template is the group 3 (28 or more characters) (step S1008). If it is within the range of the group 3, the determination value S is stored as the determination value S=4 in association with the target template.

If the number of characters of inputted subtitle is 28 to 40 characters, it is determined whether the number of characters of the subtitle of the target template is the group 3 (28 or more characters) (step S1009), If it is within the range of the group 3, the evaluation value S is stored as the evaluation value S=6 in association with the target template (step S1017), Otherwise, the target template is removed from the candidate list (step S1010). If the evaluation value S of all templates in the candidate list is determined, the subtitle determination flow ends. Input of a subtitle is optional, and if it is not inputted (that is, the number of characters is 0), the evaluation value S related to the subtitle of the target template remains 0. If none applies in the above determination, the determination value S of the target template remains 0.

As described above, in the procedure of FIG. 10, the number of characters of an inputted subtitle and the maximum number of characters set for the subtitle region are each separated into levels (grouped as described above) in a predetermined range of numbers of characters to which each belongs. If the respective ranges are matched, the target template is given a high evaluation. If the range to which the number of characters of an inputted subtitle belongs does not match the range to which the maximum number of characters belongs, the evaluation varies depending on how they do not match. If the ranges do not match and the number of inputted characters is greater than the maximum number of characters, the target template is deleted from the candidates and will not be evaluated. Meanwhile, if the ranges do not match and the number of inputted characters is shorter than the maximum number of characters, an evaluation lower than a high evaluation is given. There are also degrees of low evaluation, and the greater the gap between the number of inputted characters and the predetermined maximum number of characters for the range, the lower the evaluation.

<Determination of Message Evaluation Value>

Next, transition is made to determination of a message evaluation value, which is the last determination of the number of characters. The procedure is illustrated in FIG. 11. First, the processing is started with initialization of an evaluation value M of a message (step S1101). The evaluation value M is stored in association with each template in the candidate list. Next, it is determined in what range the number of characters of text for which characters have been inputted by the user is (step S1102). Men, the message is determined for each template for each classification of a group 1 (1 to 40 characters) and a group 2 (41 to 80 characters), and the evaluation value M is set. First, it is determined whether the number of characters of text in the target template is the group 1 (1 to 40 characters) (step S1103). If it is within the range of the group 1, the determination value is stored as M=4 (high determination value) in association with the target template (step S1107). Otherwise, it is determined whether the number of characters of text of the target template is the group 2 (41 or more characters) (step S1104). If so, the determination value M is stored as determination value M=2 in association with the target template (step S1108).

If the number of characters of inputted by the user is in a range of 41 to 80 characters, it is determined whether the number of characters of text of the target template is the group 2 (41 or more characters) (step S1105). If so, the determination value M is stored as the determination value M=4 (high determination value) in association with the target template (step S1109). Otherwise, the target template is removed from the candidate list (step S1106). If none applies, the evaluation value M remains 0.

When evaluation of the number of characters of each of a title, a subtitle, and a message is completed for all templates included in the candidate list, the evaluation values of templates are complete and the processing ends (step S1110). If none applies in the above determination, the determination value M of the target template remains 0. The evaluation values described in the present example (T/S/M) are not limited to setting of a fixed value in accordance with a condition, and it may be derived by calculation from a result of analysis according to input information. The above FIGS. 8 to 11 correspond to processing for determining input data in step S402.

As described above, in the procedure of FIG. 11, the number of characters of inputted text and the maximum number of characters set for a text region are each separated into levels (grouped as described above) in a predetermined range of numbers of characters to which each belongs. If the respective ranges are matched, the target template is given a high evaluation. If the range to which the number of characters of inputted text belongs does not match the range to which the maximum number of characters belongs, the evaluation varies depending on how they do not match. If the ranges do not match and the number of inputted characters is greater than the maximum number of characters, the target template is deleted from the candidates and will not be evaluated. Meanwhile, if the ranges do not match and the number of inputted characters is shorter than the maximum number of characters, an evaluation lower than a high evaluation is given. There are also degrees of low evaluation, and the greater the gap between the number of inputted characters and the predetermined maximum number of characters for the range, the lower the evaluation.

(Priority Determination)

Figure 12:
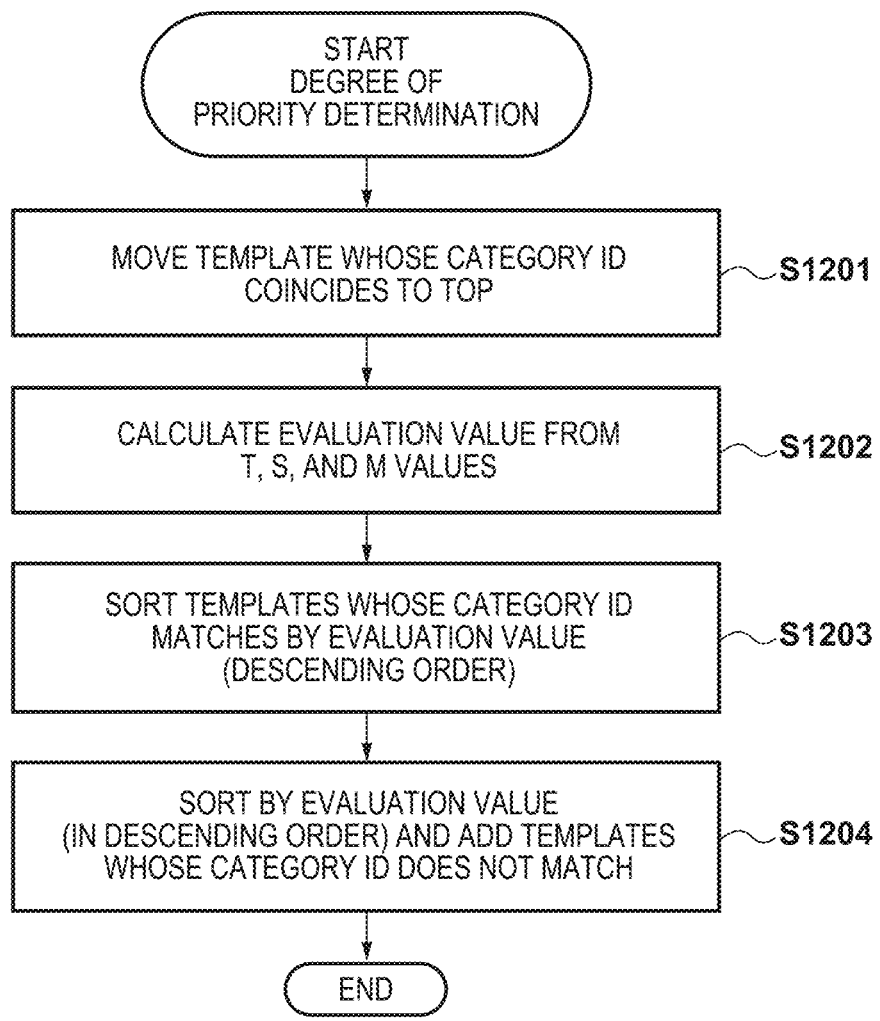
FIG. 12 is a flowchart for explaining processing for determining use of template in automatic design with respect to information inputted by a user.

Next, details of processing for assigning order of priority to candidates for a template for automatic design based on the respective evaluation values (T/S/M) (step S403) will be described with reference to FIG. 12. First, the processing for assigning order of priority to a template of a category set in the category selection region 301 in the input setting information by the user on the aforementioned basic setting screen 300 is performed. Among the templates registered in the candidate list, a template with a set category ID is moved to the top of the candidate list (step S1201). If there are a plurality of corresponding templates, they may be included in the list in sequence from the top of the list. Then, a total evaluation value is calculated based on the evaluation values (T/S/M) for each template in order (step S1202). As for the calculation of the total evaluation value, it may simply be addition of respective values or may be calculation in which coefficients are applied based on the importance of respective values.

When the total evaluation values of respective templates having the selected evaluation values are complete, templates whose category ID matches the category ID of the category specified in the category selection region 301 are sorted in descending order of the total evaluation value (step S1203). Furthermore, the same sorting processing is performed for templates whose category ID does not match (step S1204), and the processing is terminated. Thus, the candidate list is first sorted such that the priority level of a template in a specified category is higher than the priority level of a template in an unspecified category. In addition, sorting is performed such that a template with a higher evaluation value has a higher level of priority among the respective templates.

(Data Fitting Display)

Figure 13:
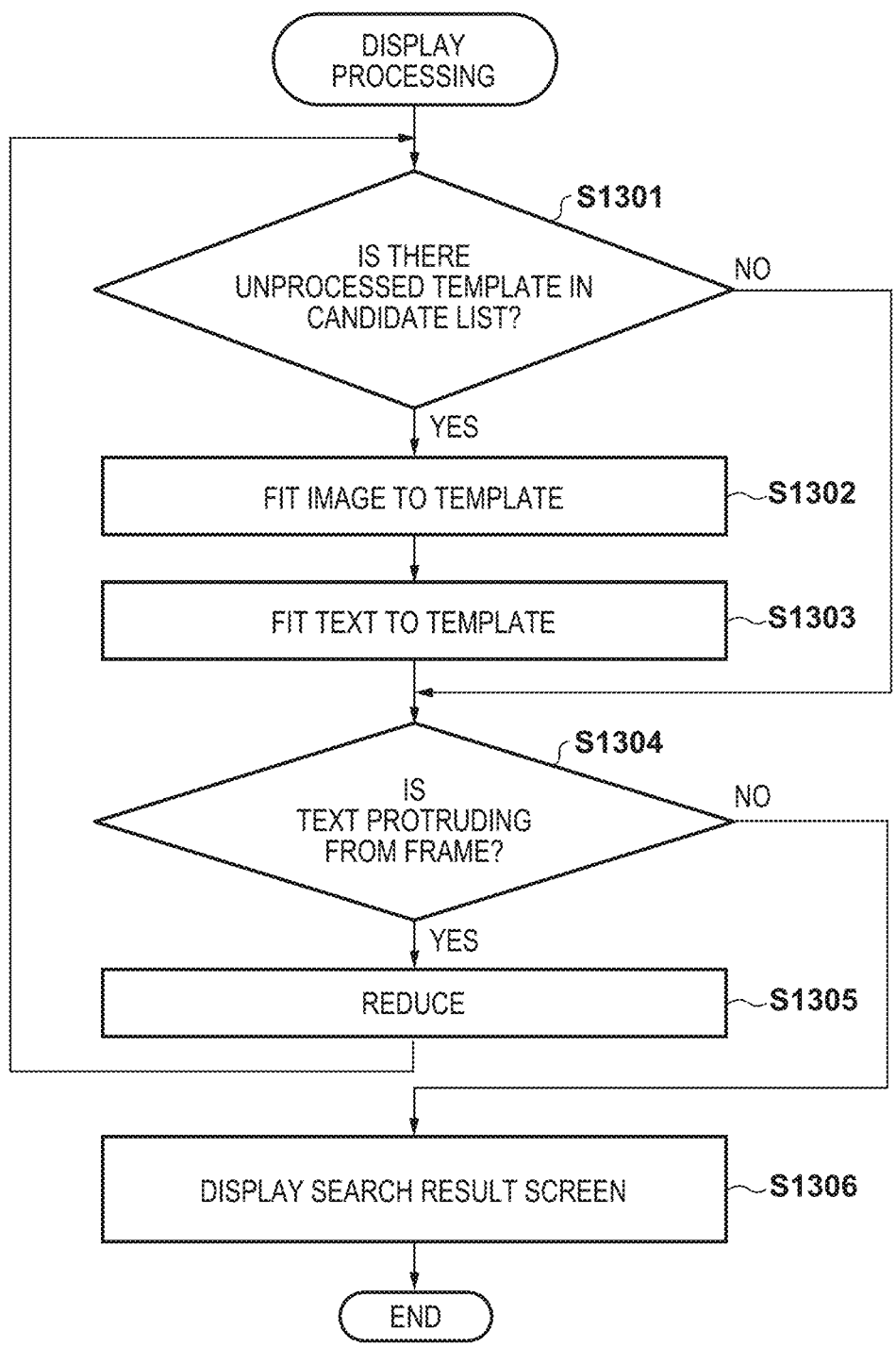
FIG. 13 is a flowchart, for explaining control processing for setting information inputted by a user to a template.

A flow for displaying templates in order of priority on the display unit 108 is illustrated in FIG. 13. This processing corresponds to step S404 of FIG. 4. Templates of the candidate list sorted by the procedure of FIG. 12 are processed, focusing in order from top of the list of candidates for a template. Once the processing for all the templates has been completed, the processing for display data ends.

First, focus is placed on the templates in order from the top of the candidate list, and it is determined whether there remain unprocessed templates (step S1301). If so, focus is placed on the template at the top. In this case, focus is placed not on a template ID in the list but on template data indicating the substance of a template corresponding to the template ID. Embedding of user input data into the template of interest is performed first from image data (step S1302). The number of images specified by the user is the same as the number of regions into which the images are to be embedded in the template; therefore, processing for sequentially incorporating the images is performed. Processing and fitting is performed in accordance with the resolution of a display image and a display frame for the image in the template when incorporating the display image into the template such the image that gets displayed and the printing result will be similar.

Next, each of a title, a subtitle, and text is embedded (step S1303). Then, determination is made, particularly for a case where a character string is shifted from a respective region (step S1304), Each region of title, subtitle, and text is set so that characters of each number of characters specified in the information file can be fitted without compromising the design. However, in extreme cases where the number of characters is the shortest or the longest, the design may be affected. The width of the fitted character string varies, especially depending on the set font or language; therefore, cases where a character string will be outside a region are detected based on content where the input character width depends on the font or language specified. If a character string will be outside a region, processing is performed so that the character string will be within the region, such as reduction of a character size (step S1305). This fitting-to-region is performed for user input characters of the title, subtitle, and message, and when application of the images and text to the template in the candidate list is completed in step S1301, transition is made to processing for screen display (step S1306).

<Thumbnail Display Processing>

Figure 14:
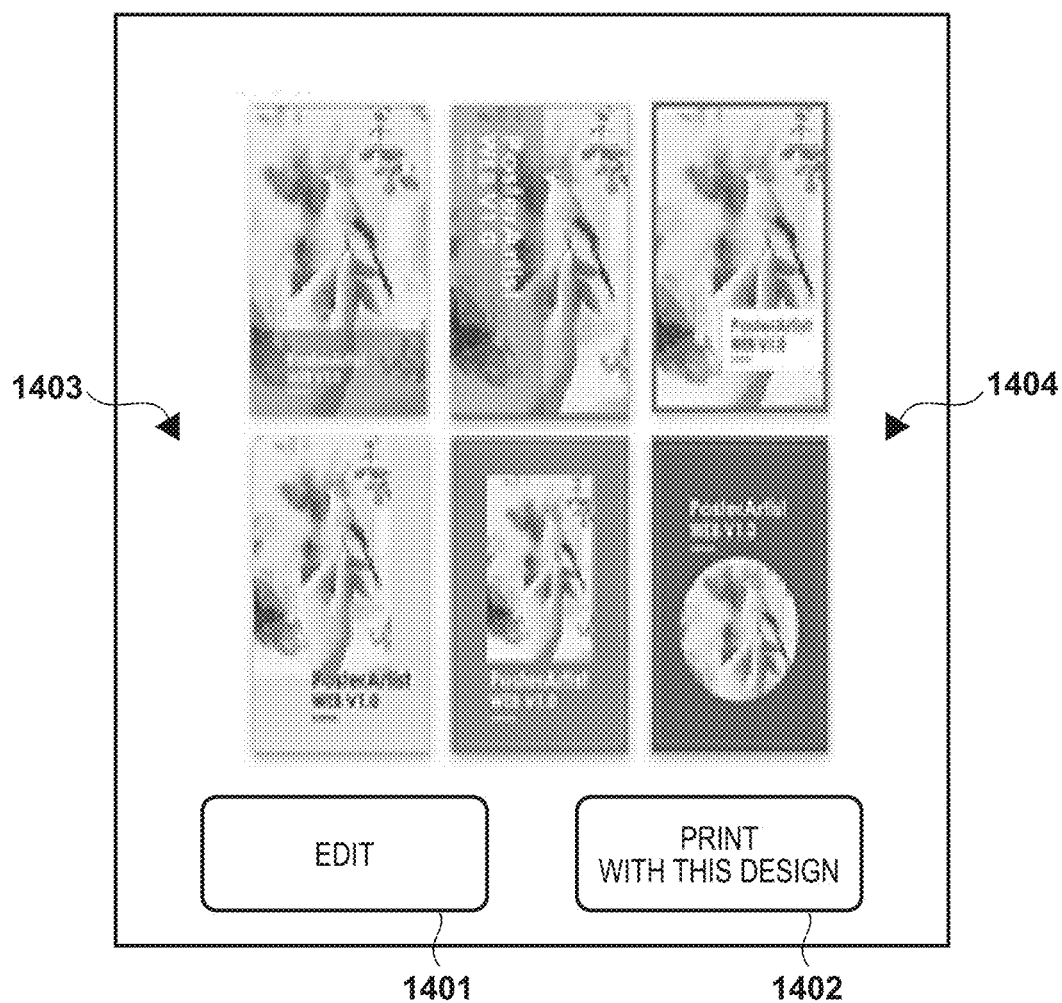
FIG. 14 is a diagram illustrating an example of a sample display of automatic design in the present application.

FIG. 14 is a diagram for explaining a screen in which six templates are displayed as an example. This screen is displayed in a form in which it is added to the screen of FIG. 3 or it replaces the screen of FIG. 3, triggered by a touch of the design generation button in the user interface screen of FIG. 3, for example. The thumbnail images of six processing templates displayed on the display unit 108 are also buttons for selecting a poster to be edited. The thumbnail images are displayed in predetermined order according to determined order of priority. For example, a thumbnail of the candidate with the highest order of priority may be placed on the upper left, and in order of priority, the next one may be placed below, and then the one after may be placed on the upper right. The same may apply from thereon. Of course, the manner of arrangement may be of another manner, or a configuration may be taken so as to enable a user to select from among a plurality of manners of arrangement. The order of priority may also be displayed above, below, or superimposed on the thumbnails to make it easy to understand the order of priority.

When an edit button 1401 is pressed on the display screen, for example, transition is made to the display of the screen 300 in a state in which the user's input content is held, and the characters can be reset. When the characters are reset, the evaluation value of a reset portion may change; therefore, execution is performed again from step S403 of FIG. 4, and the thumbnails are displayed again. When a print-with-this-design button 1402 is pressed in a state in which one template display is selected, an edit screen is transitioned to. In the edit screen, the user can continue editing arbitrarily, and printing processing can be transitioned to. Left and right scroll buttons 1403 and 1404 are buttons for performing displaying by scrolling the screen when there are a large number of thumbnail images and they cannot be displayed. Furthermore, control may be performed to display only thumbnails of a predetermined level of priority or higher.

The user can view these thumbnail images and select a poster image therefrom. The selected poster image can also be further edited. Then, the selected poster image can be printed.

As described above, candidates for a template are evaluated on a template-by-template basis based on the compatibility of data to be placed, for example, compatibility of the text and a region in which the text is to be placed and then the candidates are assigned a level of priority. The compatibility may be, for example, the compatibility between the size of a region and the amount of data to be placed therein. Then, a plurality of poster layout candidates assigned a level of priority are displayed. This allows the user to select a desired layout from a number of candidates. In addition, a level of priority being assigned to a poster candidate makes it easier for the user to make a selection and to select a layout that is closer to the user's preference. This improves the productivity of poster production and also contributes to an improvement in the quality of the posters produced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-127733, filed Aug. 3, 2021 which is hereby incorporated by reference herein in its entirety.

What is claimed is:

1. An information processing method in an information processing apparatus comprising a storage unit configured to store a plurality of templates including a region in which data can be placed; the method comprising:
   specifying data to be placed in the plurality of templates;
   outputting an image in which the data is placed in a template, from among the plurality of templates, and which is based on data to be placed in the region and including text inputted by a user; and
   evaluating each of the plurality of templates based on a compatibility between the region included in each of the plurality of templates and data to be placed in the region, and assigning an order of priority,
   wherein a character string is included in data to be placed in each of the plurality of templates, and
   in the evaluating, for each of the plurality of templates evaluated, evaluation of a template is performed based on a number of characters of a character string specified in the specifying and a range of numbers of characters defined in advance for a region in which the character string is to be placed.

2. The information processing method according to claim 1, wherein
   a category is associated with each of the plurality of templates,
   the method further comprises specifying the category, and
   a template to be evaluated in the evaluating is a template associated with the category specified in the specifying.

3. The information processing method according to claim 1, wherein
   an image is included in data to be placed in each of the plurality of templates, and
   a template to be evaluated in the evaluating is a template including a number of regions in which an image can be placed that coincides with a number of images specified in the specifying.

4. The information processing method according to claim 1, wherein
   in the evaluating, for each of the plurality of templates, a template is not made a target of evaluation if a range in which a number of characters of the specified character string belongs does not coincide with a range in which a maximum number of characters defined in advance for a region in which the character string is to be placed belongs, and if the number of characters of the specified character string is larger than the maximum number of character defined in advance for the region in which the character string is to be placed.

5. The information processing method according to claim 1, wherein
in the evaluating, for each of the plurality of templates, a template is assigned a highest evaluation value if a range in which a number of characters of the specified character string belongs does not coincide with a range in which a maximum number of characters defined in advance for a region in which the character string is to be placed belongs.

6. The information processing method according to claim 5, wherein
in the evaluating, for each of the plurality of templates, a template is assigned a lower evaluation value than the highest evaluation value if a range in which a number of characters of the specified character string belongs does not coincide with a range in which a maximum number of characters defined in advance for a region in which the character string is to be placed belongs, and if the number of characters of the specified character string is smaller than the maximum number of character defined in advance for the region in which the character string is to be placed.

7. The information processing method according to claim 5, wherein
each of the plurality of templates includes, as a region in which the character string is to be placed, a region of a title, a region of a subtitle, and a region of text, and
in the evaluating, for each of the region, the evaluation value is assigned, and the order of priority is determined based on an overall evaluation of the evaluation value.

8. The information processing method according to claim 1, further comprising:
selecting one from candidates that are the image outputted in the outputting; and
outputting to a printing apparatus an image selected from the candidates that are the image.

9. A non-transitory computer-readable storage medium storing a computer program which, when loaded into a computer and executed, causes the computer to perform an information processing method, the method comprising:
storing a plurality of templates including a region in which data can be placed;
specifying data to be placed in the plurality of templates; and
outputting an image in which the data is placed in a template, from among the plurality of templates, and which is based on data to be placed in the region and including text inputted by a user; and
evaluating each of the plurality of templates based on a compatibility between the region included in each of the plurality of templates and data to be placed in the region, and assigning an order of priority,
wherein a character string is included in data to be placed in each of the plurality of templates, and
in the evaluating, for each of the plurality of templates, evaluation of a template is performed based on a number of characters of a character string specified in the specifying and a range of numbers of characters defined in advance for a region in which the character string is to be placed.

10. An information processing apparatus, comprising:
at least one memory storing at least one program; and
at least one processor, wherein the at least one program causes the at least one processor to:
store a plurality of templates including a region in which data can be placed;
specify data to be placed in the plurality of templates;
output an image in which the data is placed in a template, from among the plurality of templates, and which is based on data to be placed in the region and including text inputted by a user; and
evaluate each of the plurality of templates based on a compatibility between the region included in each of the plurality of templates and data to be placed in the region, and assign an order of priority,
wherein a character string is included in data to be placed in each of the plurality of templates, and
in the evaluating, for each of the plurality of templates evaluated, evaluation of a template is performed based on a number of characters of a character string specified in the specifying and a range of numbers of characters defined in advance for a region in which the character string is to be placed.

11. The information processing apparatus according to claim 10, wherein
in accordance with the order of priority, images in which the data is placed in the plurality of templates are outputted as candidates for an image to be generated.

12. The information processing apparatus according to claim 11, wherein
an image is included in data to be placed in each of the plurality of templates, and
a template to be evaluated in the evaluating is a template including a number of regions in which an image can be placed that coincides with a number of images specified in the specifying.

13. The information processing apparatus according to claim 11, wherein
in the evaluating, for each of the plurality of templates, a template is not made a target of evaluation if a range in which a number of characters of the specified character string belongs does not coincide with a range in which a maximum number of characters defined in advance for a region in which the character string is to be placed belongs, and if the number of characters of the specified character string is larger than the maximum number of character defined in advance for the region in which the character string is to be placed.

14. The information processing apparatus according to claim 11, wherein
in the evaluating, for each of the plurality of templates, a template is assigned a highest evaluation value if a range in which a number of characters of the specified character string belongs does not coincide with a range in which a maximum number of characters defined in advance for a region in which the character string is to be placed belongs.

15. The information processing apparatus according to claim 14, wherein
each of the plurality of templates includes, as a region in which the character string is to be placed, a region of a title, a region of a subtitle, and a region of text, and
in the evaluating, for each of the region, the evaluation value is assigned, and the order of priority is determined based on an overall evaluation of the evaluation value.

16. The information processing apparatus according to claim 10, wherein
the at least one program causes the at least one processor to further: select one from candidates that are image outputted in the outputting; and output to a printing apparatus an image selected from the candidates that are the image.

\* \* \* \* \*